United States Patent [19]
Sharf et al.

[11] Patent Number: 5,487,707
[45] Date of Patent: Jan. 30, 1996

[54] PUZZLE CUT SEAMED BELT WITH BONDING BETWEEN ADJACENT SURFACES BY UV CURED ADHESIVE

[75] Inventors: Lucille M. Sharf, Pittsford; Laurence J. Lynd, Macedon; James F. Smith, Walworth; Edward L. Schlueter, Jr., Rochester, all of N.Y.

[73] Assignee: Xerox Corporation, Stamford, Conn.

[21] Appl. No.: 297,201

[22] Filed: Aug. 29, 1994

[51] Int. Cl.⁶ ..................................................... F16G 1/00
[52] U.S. Cl. ....................................................... 474/253
[58] Field of Search ................................. 474/253–257; 24/38; 138/169; 198/520; 451/531; 524/518

[56] References Cited

U.S. PATENT DOCUMENTS

| | | | |
|---|---|---|---|
| 766,930 | 8/1904 | Clemons | 474/254 X |
| 1,303,687 | 5/1919 | Leffler | 138/169 |
| 2,060,906 | 11/1936 | Snyder | 428/57 |
| 2,069,362 | 2/1937 | Ford | 24/38 |
| 2,441,460 | 5/1948 | Walters | 474/254 |
| 2,461,859 | 2/1949 | Vasselli | 24/38 |
| 2,792,318 | 5/1957 | Welch | 428/60 |
| 3,300,826 | 1/1967 | Read | 24/38 |
| 3,342,656 | 9/1967 | Papageorges | 156/159 |
| 3,729,873 | 5/1973 | Sandell | 451/531 |
| 4,063,463 | 12/1977 | Nordengren | 474/254 |
| 4,808,657 | 2/1989 | Brown | 524/518 |
| 4,899,868 | 2/1990 | Johnson | 198/520 |
| 5,092,823 | 3/1992 | Longo | 474/253 |

Primary Examiner—Michael Powell Buiz
Attorney, Agent, or Firm—Samuel E. Mott; Zosan S. Soong

[57] ABSTRACT

An endless flexible seamed belt formed by joining two ends of material from which the belt is fabricated each end of which has a plurality of mutually mating elements in a puzzle cut pattern the opposite surfaces of which are in interlocking relationship to prevent separation of the ends and which form a seam when joined mechanically to enable the seamed flexible belt to essentially function as an endless belt having a substantially uniform thickness, said seam having voids between the surfaces of mutually mating elements, the opposite surfaces of the puzzle cut pattern being bound by an adhesive which has been cured by exposure to ultraviolet radiation and joined together to enable the seamed flexible belt to essentially function as an endless belt.

23 Claims, 8 Drawing Sheets

PUZZLE CUT SEAMED BELT WITH BONDING BETWEEN ADJACENT SURFACES BY UV CURED ADHESIVE

CROSS REFERENCE TO RELATED APPLICATION

Attention is hereby directed to copending U.S. patent application Ser. No. 08/297,200 entitled "Puzzle Cut Seamed Belt" in the name of Edward L. Schlueter Jr. et al.; U.S. patent application Ser. No. 08/297,203 entitled "Puzzle Cut Seamed Belt With Bonding Between Adjacent Surfaces" in the name of Laurence J. Lynd. et al.; U.S. patent application Ser. No. 08/297,198 entitled "Puzzle Cut Seamed Belt With Strength Enhancing Strip" in the name of Thomas C. Parker et al., all commonly assigned to the assignee of the present invention and filed concurrently herewith.

BACKGROUND OF THE INVENTION

The present invention is directed to an endless flexible seamed belt having improved seam quality and smoothness with substantially no thickness differential between the seamed portion of the belt and the adjacent portions of the belt and having a strength enhancing bond formed in voids between mutually mating elements of the belt of a material which is chemically and physically compatible with the belt material.

Perhaps, the most important invention that may have ever been made was that of the wheel. Arguably, one of the follow-on inventions of almost equal importance was directed to a belt. Initially, the belts were fabricated by taking two ends of a web material and fastening them together by a variety of techniques such as sewing, wiring, stapling, providing adhesive joints, etc. While such joined or seamed belts are suitable for many applications, such as the delivery of rotary motion from a source such as a motor, to implement a device such as a saw blade, they are not as satisfactory in many of the more sophisticated applications of belt technology in common practice today. In the technology of the current day many applications of belts require much more sophisticated qualities and utilities, and in particular, for such special applications as in electrostatographic and electrographic imaging apparatus and processes for use as photoreceptors, intermediate sheet and/or image transport devices, fusing members or transfix devices. It is ideal to provide a seamless belt whereby there is no seam in the belt which mechanically interferes with any operation that the belt performs or any operation that may be performed on the belt. While this is ideal the manufacture of seamless belts requires rather sophisticated manufacturing processes which are expensive and are particularly more sophisticated, difficult and much more expensive for the larger belts. As a result, various attempts have been made to provide seamed belts which can be used in these processes. Previous attempts to manufacture seamed belts have largely relied on belts where the two ends of the belt material have been lapped or overlapped to form the seam or have butted against one another and then fastened mechanically by heat or other means of adhesion such as by the use of an adhesive or ultrasonic welding.

The belts formed, according to the typical butting technique, while satisfactory for many purposes, are limited in bonding strength and flexibility because of the limited contact area formed by merely butting the two ends of the belt material. Furthermore, belts formed according to the butting or overlapping technique provide a bump or other discontinuity in the belt surface leading to a height differential between adjacent portions of the belt, of 0.010 inches or more depending on the belt thickness, which leads to performance failure in many applications. For example, one of the most severe problems involves cleaning the imaging belt of residual toner after transfer of the toner image. Intimate contact between the belt and cleaning blade is required. With a bump, crack or other discontinuity in the belt, the tuck of the blade is disturbed which allows toner to pass under the blade and not be cleaned. Furthermore, seams having differential heights may when subjected to repeated striking by cleaning blades cause the untransferred, residual toner to be trapped in the irregular surface of the seam. Furthermore, photoreceptors which are repeatedly subjected to this striking action tend to delaminate at the seam when the seam is subjected to constant battering by the cleaning blade. As a result, both the cleaning life of the blade and the overall life of the photoreceptor can be greatly diminished as well as degrading the copy quality. In addition, such irregularities in seam height provide vibrational noise in xerographic development which disturb the toner image on the belt and degrades resolution and transfer of the toner image to the final copy sheet. This is particularly prevalent in those applications requiring the application of multiple color layers of liquid or dry developer on a photoreceptor belt, which are subsequently transferred to a final copy sheet. In these applications, it is desired to provide a seam height differential between the seam and the unseamed adjacent portions less than 0.001 inches. In addition, the presence of the discontinuity in belt thickness reduces the flex life and continuity of strength of the belt which for prolonged use is desirably 80–90% that of the parent material unseamed. In addition, the discontinuity or bump in such a belt may result in inaccurate image registration during development, inaccurate belt tracking and overall deterioration of motion quality, as a result of the translating vibrations.

While the endless puzzle cut seamed belt described in the above referenced U.S. application Ser. No. 08/297,200 performs satisfactorily in many applications, there are additional applications in which a more secure joining of the ends of the belt at the seam are desired. In addition, the alternative techniques described in U.S. application Ser. No. 08/297198 and U.S. application Ser. No. 08/297,203, require the application of relatively high levels of heat to either the belt material, the adhesive to form a more secure joining or bond of the ends of the belt at the seam area. This application of high heat has a tendency to distort the nodes of the puzzle cut pattern creating thermal and mechanical stresses in the belt material which may end up forming little ripples in the belt material, resulting in a copy quality defect such as a lack of transfer of toner material resulting in a print deletion. It is to this end that the present invention is directed.

SUMMARY OF THE INVENTION

Accordingly, it is a principle object of the present invention to provide a seamed belt with mechanically invisible seams substantially equivalent in performance to that of a seamless belt.

It is a further object of the present invention to provide an endless seamed belt where there is substantially no bump or height differential between the seamed portions and unseamed portions on each side of the seam, leading to performance failure, or degradation of cleaning blade performance, image registration, belt tracking or motion quality from translating vibrations.

According to a principle aspect of the present invention the above objects are obtained by providing a flexible seamed belt formed by joining two ends of the belt material each of which has a plurality of mutually mating elements in a puzzle cut pattern, the opposite surfaces of which are in interlocking relationship to prevent separation of the ends and which form a seam when joined mechanically to enable the seamed flexible belt to essentially function as an endless belt having a substantially uniform thickness, said seam having voids between the surfaces of mutually mating elements, the opposite surfaces of the puzzle cut pattern being bound or joined together by an adhesive which has been cured by exposure to ultraviolet radiation to enable the seamed flexible belt to essentially function as an endless belt.

In a further aspect of the present invention the belt may be fabricated from a thermoplastic or a thermosetting material.

In a further aspect of the present invention both the adhesive and the belt material are thermoplastics.

In a further aspect of the present invention the belt material is a thermoset material and the adhesive is a thermoplastic which has been heated to flow the thermoplastic material into the void between the opposite surfaces of the mutually mating elements and then exposed to ultraviolet radiation.

In a further aspect of the present invention the adhesive substantially fills the voids between the opposite surfaces of the mutually mating elements and is chemically bound to the material from which the belt is fabricated.

In a further aspect of the present invention the seam is mechanically invisible and thus substantially equivalent in performance to a seamless belt.

In a further aspect of the present invention the adhesive is physically bound to the material from which the belt is fabricated.

It is a further principle aspect of the present invention that the adhesive is a thermoplastic or thermoset material and the belt is fabricated from either a thermoplastic or thermoset material.

It is a further aspect of the present invention that the adhesive is made from the same material from which the belt is fabricated and that both the adhesive and belt materials are thermoplastic.

In a further aspect of the present invention the adhesive material is a material different from that which the belt is fabricated from such as a belt material of a thermoset and an adhesive of a thermoplastic material.

It is a further aspect of the present invention that the adhesive substantially fills the kerf or void between the opposite surfaces of the mutually mating element.

In a further aspect of the present invention the adhesive is chemically and/or physically bound to the material from which the belt was fabricated.

It is a further aspect of the present invention that the opposite surfaces of the puzzle cut pattern be bound together with sufficient physical integrity to enable the seamed flexible belt to essentially function as an endless belt.

It is a further aspect of the present invention wherein the interlocking elements all have curved mating surfaces.

It is a further aspect of the present invention wherein the mutual mating elements are male and female interlocking portions and wherein the mating interlocking elements have the same configuration.

It is a further aspect of the present invention wherein each of the interlocking elements has a post portion and a larger head portion.

In a further aspect of the present invention the mutual mating interlocking elements form a dovetail pattern.

In a further aspect of the present invention the post portion and head portion form interlocking nodes.

It is a further aspect of the present invention to provide a seamed belt wherein the height or thickness differential between the seamed and unseamed portions is less than 0.001 inch.

It is a further aspect of the present invention to provide a seam in a seamed belt having at least 80% and preferably 90% of the tensile strength of the parent belt material.

It is a further aspect of the present invention to provide a seamed belt having the seam bond strength and flexibility capable of at least 500,000 cycles without seam failure.

DESCRIPTION OF PREFERRED EMBODIMENT

Figure 1:
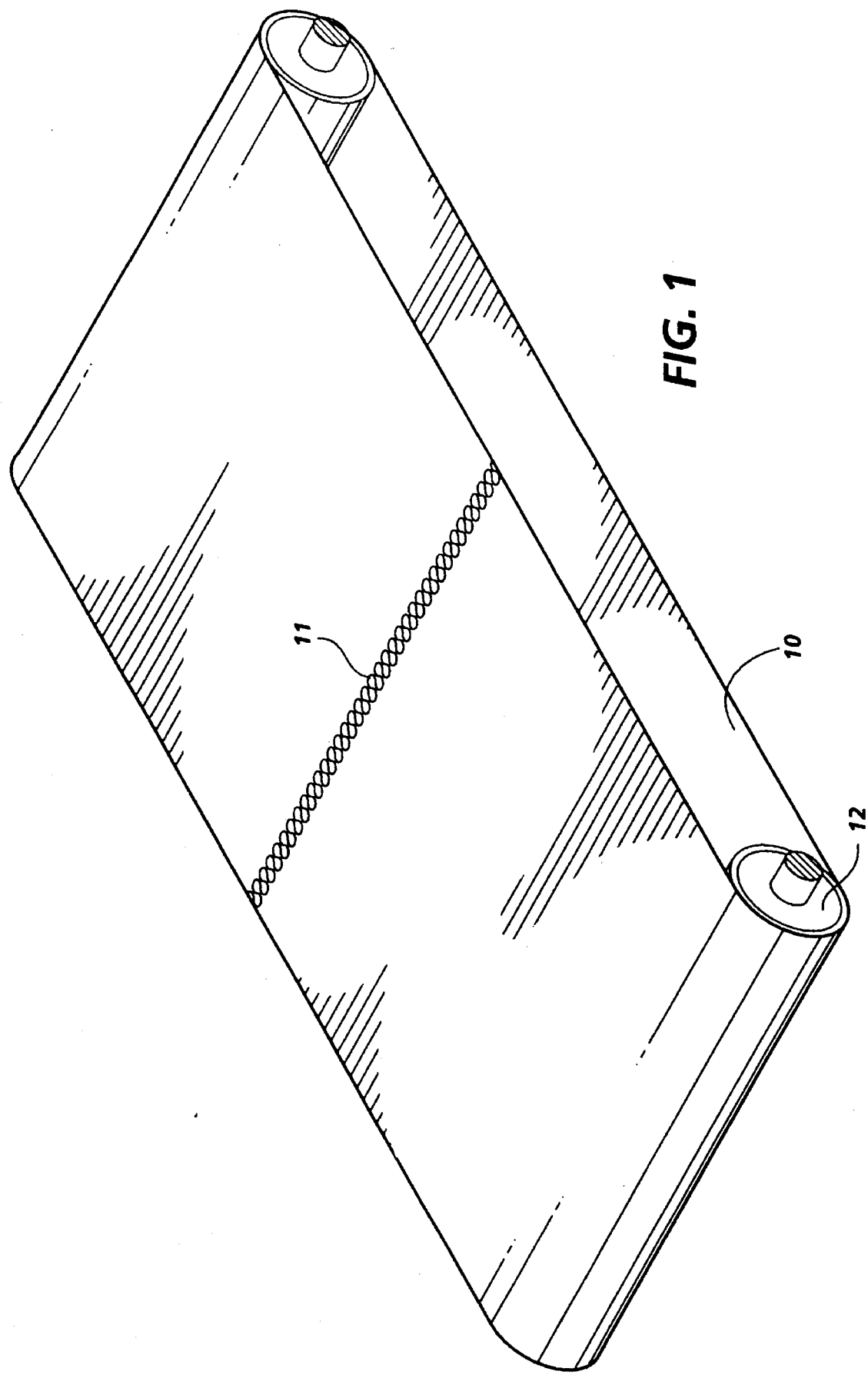
FIG. 1 is an isometric representation of the flexible puzzle cut seamed belt formed according to the present invention providing a mechanically invisible and substantially equivalent seam in performance to that of a seamless belt.

With continued reference to the Figures and additional reference to the following description the invention will be described in greater detail. The seam formed according to the present invention is one of enhanced strength, flexibility and mechanical life which is held together by the geometric relationship between the ends of the belt material, which are fastened together by a puzzle cut, meaning that the two ends interlock with one another in the manner of an ordinary puzzle and wherein the seam has a kerf or voids between the surfaces of mutually mating elements, the opposite surfaces of the puzzle cut pattern being bound or joined together to enable the seamed flexible belt to essentially function as an endless belt. The joining of the opposite surfaces of the mutually mating elements forming the seam may be either a physical joining, chemical joining or some combination of physical and chemical joining. Typically, this joining provides a bonding between the opposite surfaces of the mutual mating elements which provides an improved seam quality and smoothness with substantially no thickness differential between the seam and the adjacent portions of the belt. Thereby providing enhanced imaging, registration and control as discussed above. In this regard, it should be noted that the lower the differential and height, the faster that the belt may travel.

The opposite surfaces of the puzzle cut pattern in the belt seam may be joined with an adhesive which is physically and chemically compatible adhesive which is cured by exposure to ultraviolet radiation. In any case, the opposite surfaces of the puzzle cut pattern being joined together are bound with sufficient physical integrity to enable the seamed flexible belt to essentially function as an endless belt. The adhesive may be applied to the kerf or voids between the mutually mating elements, and in particular, to the opposite surfaces of the puzzle cut pattern. In this regard, the viscosity of the adhesive is important since it's performance depends on it's ability to wick into the voids or the kerf between adjacent cut pieces of the pattern. In addition, the surface energy of the UV cured adhesive must be compatible with the material from which the belt is fabricated so that it adequately wets and spreads in the belt seam. As previously described good adhesion is required to enable the performance requirements previously discussed with regard to comparing it to the original material. The kerf, the distance between adjacent surfaces of the mutually mating elements of the belt ends can be built into the belt ends by way of a mechanical die or it can be built into by way of cutting with a laser beam. Following fabrication, the belt may be finished by way of buffing or sanding and further, may have an overcoating applied, typically, of a thickness of 0.001 to 0.003 inch in thickness which can be initially applied to the unseamed belt, the belt seamed and the seamed area filled from the back of the belt to maintain the uniformity of the functional surface. Preferably, and by far the most economical matter is to form the belt seam initially and then apply the desired overcoating.

Referring to FIG. 1, it should be noted that the mechanical interlocking relationship of the seam 11 is present in a two dimensional plane when the belt 10 is on a flat surface, whether it be horizontal or vertical. While the seam is illustrated in FIG. 1 as being perpendicular to the two parallel sides of the belt it will be understood that it may be angled or slanted with respect to the parallel sides. This enable any noise generated in the system to be distributed more uniformly and the forces placed on each mating element or node to be reduced.

The endless flexible seamed belt may be made of any suitable material. Typical materials include, photoreceptor materials which may be multilayered such as those described in U.S. Pat. No. 4,265,990, as well as a variety of thermoplastic and thermosetting belt materials. Any suitable belt material may be employed. Typical materials include polyesters, polyurethanes, polyimides, polyvinyl chloride, polyolefins such as polyethylene and polypropylene and polyamides such as nylon, polycarbonates, acrylics, polyphenylsulfide, all of which may be unfilled or filled with fillers such as metal oxides, or carbon to obtain desired properties. In addition, elastomeric materials such as silicones, fluorocarbons such as Vitons E. I. DuPont™, EPDM and nitriles etc. may be used. For certain purposes metallic cloth and even paper may be used. The belt material is selected to have the appropriate physical characteristics for specific utilities such as tensile strength, Young's modulus, $1\times10^3$ to $1\times10^6$, electroconductivity, typically $10^8$ to $10^{11}$ ohm cm volume resistivity thermal conductivity, stability, flex strength and in certain applications, such as transfix, being capable of being subjected to high temperatures. Other important characteristics of the belt material, depending on its use, include surface energy desired low for good toner release, for example, gloss, dielectric constant and strength.

The puzzle cut pattern may be formed according to any conventional shaping technique, such as by die cutting or laser cutting with commercially available lasers, such as a $CO_2$ laser or excimer laser generating a beam of sufficient width and intensity that within an acceptable time will provide the desired cut. Following cutting by the laser beam it can be deburred and cleaned by air, ultrasonics or brushing if necessary. In addition to puzzle cut patterns formed by joining the two ends, they may be formed on each of the ends by a male and female punch with the belt material in between which punches out the shape. Alternatively, it could be a pattern on a wheel which rolls over the material.

Figure 2:
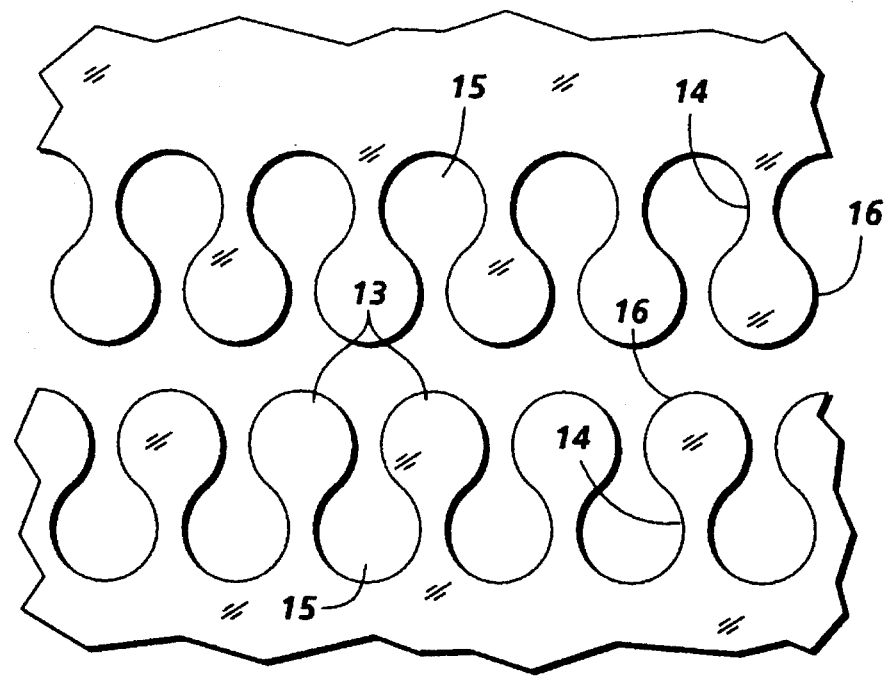
FIG. 2 is an enlarged view of a puzzle cut pattern used on both joining ends of the belt material to provide interlocking elements having a post portion 14 and a larger head portion 16.
Figure 3:
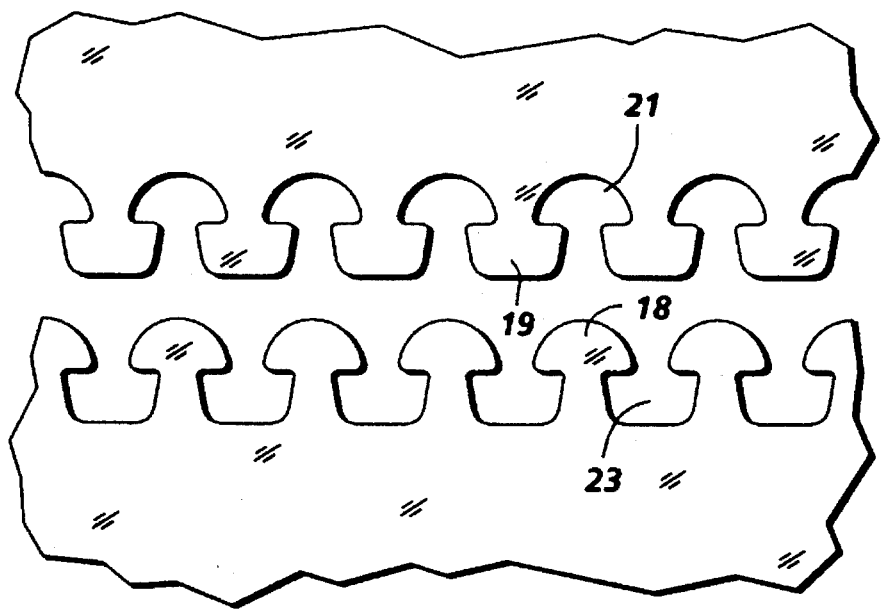
FIG. 3 is illustrative of an alternative configuration wherein male 18, 19 and female 21, 23 interlocking portions having curved mating elements are used in the two ends of the belt material which are joined.
Figure 4:
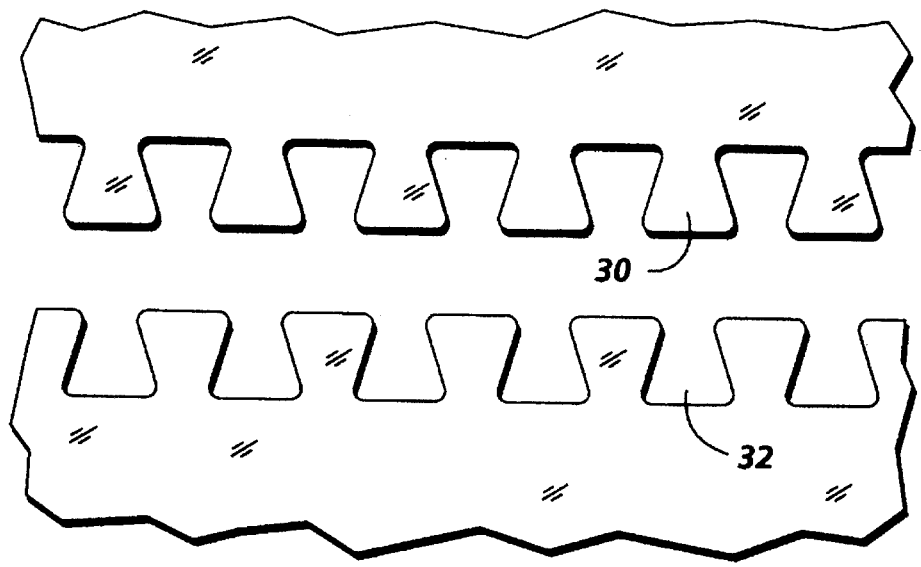
FIG. 4 is a further alternative embodiment wherein the interlocking elements 30, 32 form a dovetail pattern having curved mating elements.
Figure 5:
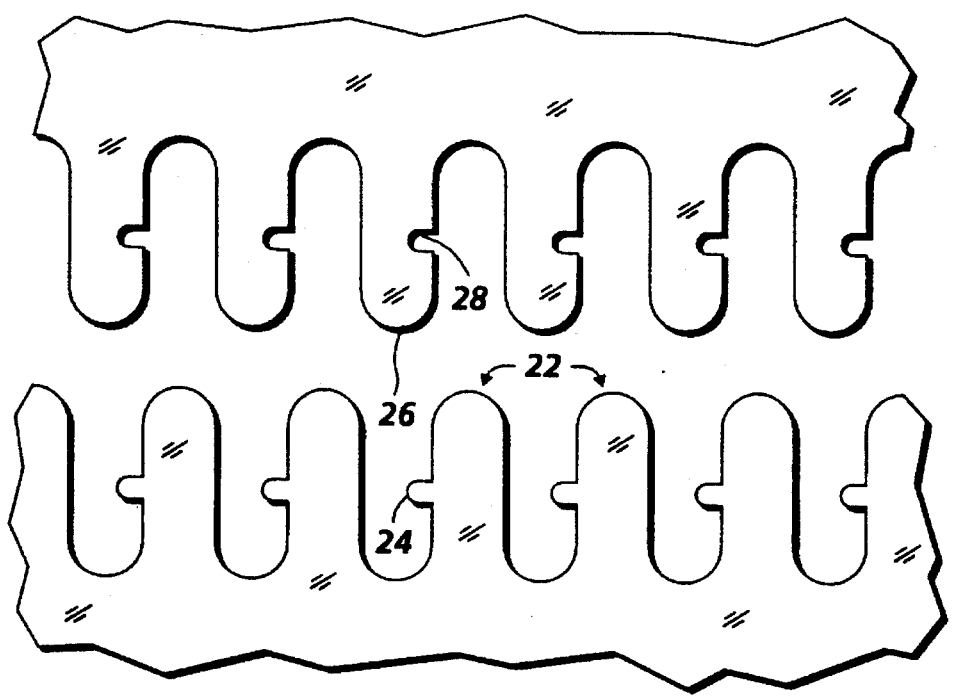
FIG. 5 is an additional alternative embodiment wherein the interlocking relationship between the puzzle cut pattern on both ends is formed from a plurality of finger joints 22, 26.

As may be observed from the drawings, the puzzle cut pattern may take virtually any form, including that of teeth or nodes such as identical post or neck 14 and head 16 patterns of male 13 and female 15 interlocking portions as illustrated in FIG. 2, or a more mushroom-like shaped pattern having male portions 18 and 19 and female portions 21 and 23 as illustrated in FIG. 3 as well as a dovetail pattern as illustrated in FIG. 4. The puzzle cut pattern illustrated in FIG. 5 has a plurality of male fingers 22 with interlocking teeth 24 and plurality of female fingers 26 which have recesses 28 to interlock with the teeth 24 when assembled. It is important that the interlocking elements all have curved mating elements to reduce the stress concentration between the interlocking elements and permit them to separate when traveling around curved members such as the rolls 12 of FIG. 1. It has been found that with curved mating elements that the stress concentration is lower than with square corners where rather than the stress being uniformly distributed it is concentrated leading to possible failure.

The mechanical bonding strength and flexibility of the bond should be capable of supporting a belt cycling of at least 500,000 and the height differential between the seamed portion and the unseamed portion on each side of the seam about 0.001 inch and the seam have a tensile strength of at least 80% and preferably 90% of the parent belt material strength.

The following is a discussion of the interrelationship among the various belt and material parameters involved in the mechanical integrity of the seam.

The mechanical integrity of the seam was examined and analyzed for a number of configurations and in particular for the preferred configuration which involves nodes forming parts of a circle and interconnecting via a neck on the opposite side. To determine the deflection under loading conditions, each such node is treated as a beam fixed at the narrowest part of the neck joining the node to the base and the deflection of each tooth (node and neck) is calculated in terms of the orientation of the load relative to the beam. To assure that the seam will not come apart under load, it is imposed that the maximum deflection of each tooth, when the load, under worse conditions, is normal to the beam, would not exceed the thickness of the belt itself. Clearly, if the deflection of the tooth is in excess of the thickness of the belt then the seam will come apart. Under the above brief analysis, a master relationship connecting a material parameter M typical of the configuration with a geometric parameter G such that the belt will not come apart under loading.

$$M = \frac{1-G}{\left(1+\sqrt{4-\frac{1}{G^2}}\right)^3} \quad (1)$$

Figure 6A:
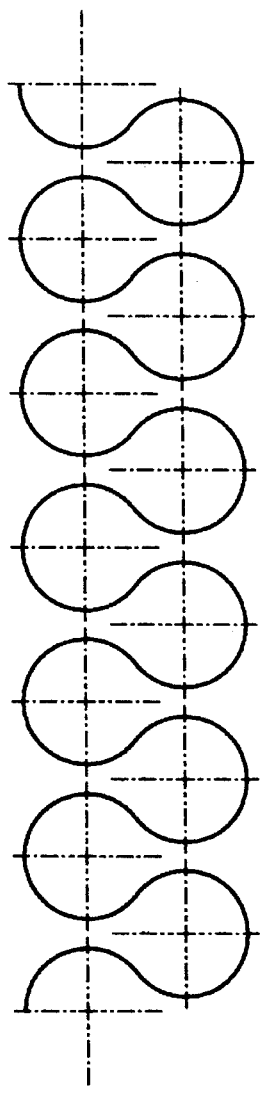
FIGS. 6A, 6B and 6C are three representations of the puzzle cut configuration which will be discussed hereinafter.
Figure 6B:
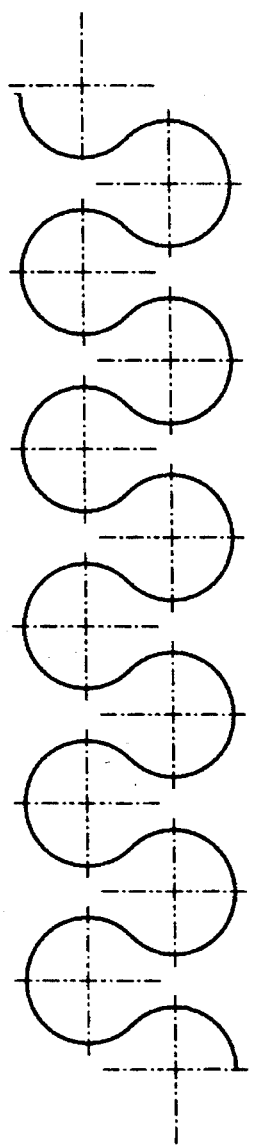
Figure 6C:
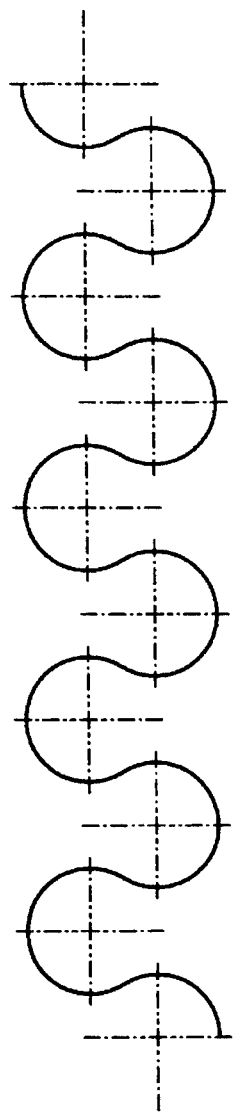
Figure 7:
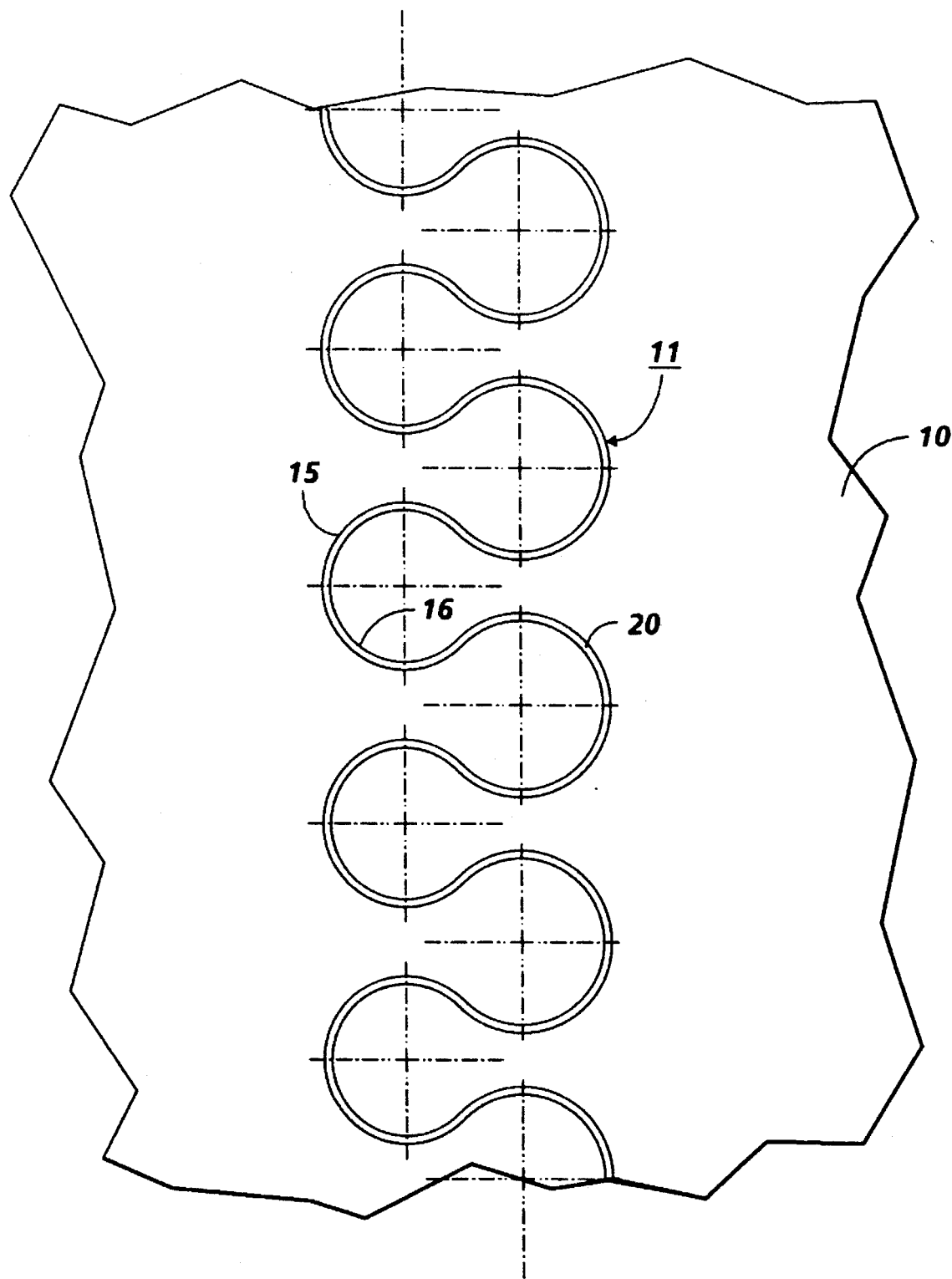
FIG. 7 is a greatly exaggerated in scale representation illustrating essentially a small kerf or space 20 between interlocking elements.
Figure 8:
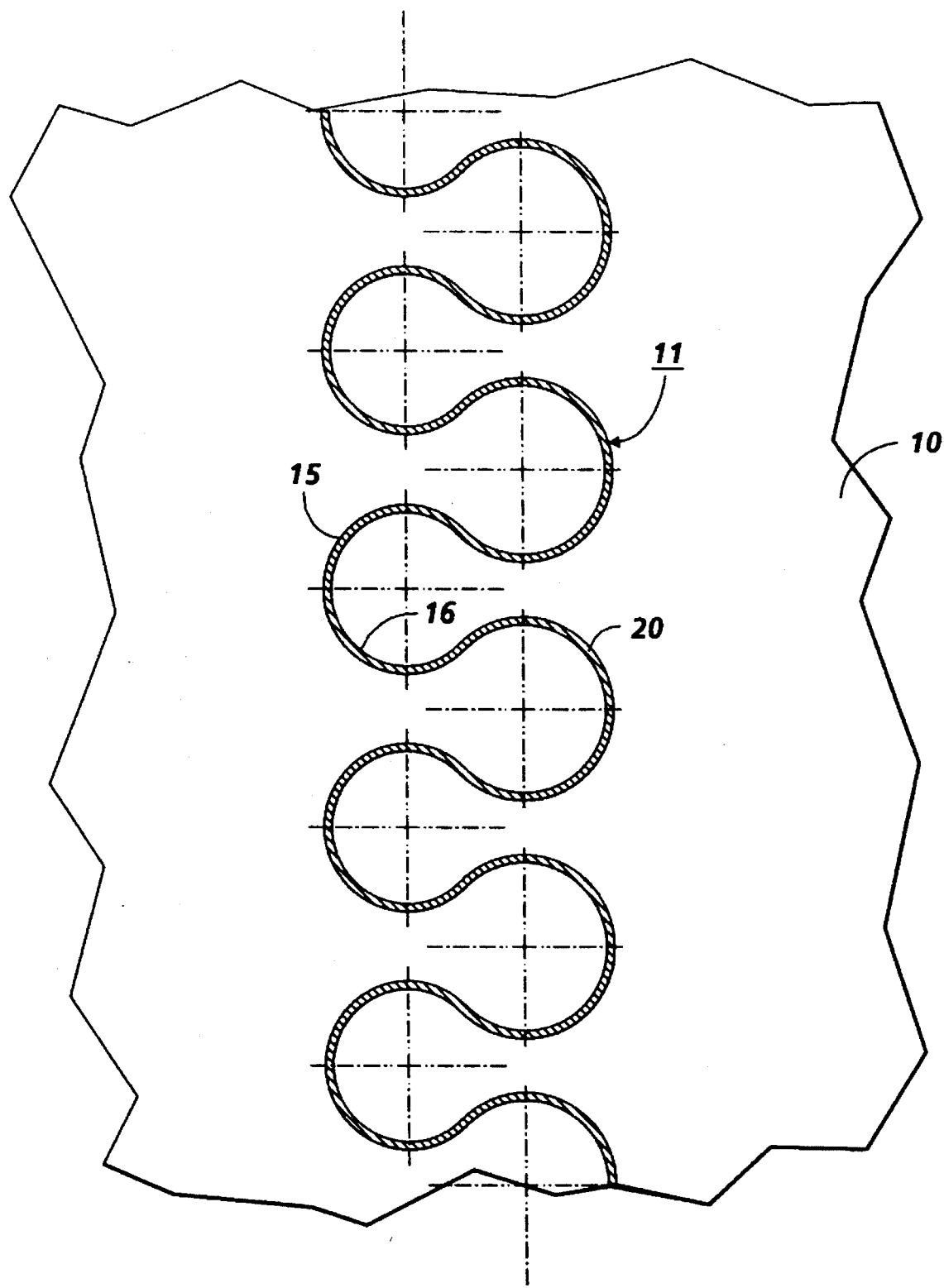
FIG. 8 is a greatly exaggerated in scale representation illustrating essentially a small kerf or space 20 between interlocking elements which may for example be each precision die cut or laser cut from two separate pieces of material wherein the cutting of one element may be compensated for the kerf or space between elements, the kerf having been filled with the UV cured adhesive as illustrated by cross hatching.

In this relationship M is a dimensionless quantity given by $$M = \frac{4NR^3}{Et^4} \quad (2)$$

and G represents the ratio $$G = 2R/w \quad (3)$$

where N is the total load per unit width (i.e. lbs/in.) acting on the belt, E is the modulus of elasticity of the belt material t, the thickness of the belt, R the radius of the circular node forming the seam, and w is the wave length of one whole period between two adjacent nodes. Equation (1) is a one-to-one relationship between the material parameter M and the geometric parameter G. Thus, given one of them we can find the other parameter. Furthermore, because of the dimensionless nature of these two parameters, a multitude of configurations are embodied in each pair of values satisfying equation (1), by virtue of the fact that there is an infinite number of combinations of the variables involved in that particular pair of values of M and G. Inspection of the geometry of the node shows that the structure is characterized by two main features: the shoulder, or that portion where there is interference between adjacent teeth, which supports the seam, and the neck of each tooth which represents its strength under loading. The size of the shoulder should be sufficient to insure mechanical integrity of the seam without making the neck too small as to weaken its strength. In this regard attention is directed to FIGS. 6A, 6B and 6C wherein it can be visually observed that the size of the neck in FIG. 6A is too small and the size of the shoulder in FIG. 6C does not provide sufficient interference contact while the geometry in FIG. 6B appears to be optimum. Table 1 below lists the various parameters for the identified belt characteristics. While all samples will function as noted above, a value of G of 0.6 is a good compromise. Many of the samples of course are impractical to implement relative to factors such as manufacturing ease, costs, stress tolerance, etc. Equation (3) shows that G can only vary between ½ and 1, the first value refers to the case when the shoulder is zero, and the second value pertains to the case when the neck of the tooth is zero and the node has no strength. Once either M or G is known the entire configuration becomes determinate with the help of the above equations and other standard geometric relationships. Measurements on actual belts have generally confirmed the above analysis. To illustrate the solution methodology, suppose a belt material of Young's modulus $E=5\text{X}\times10^5$ psi and thickness t=0.004"is subjected to a tension N=2.0 lb./in. of belt width. H is the perpendicular height between centers of one node or one side of the seam and a node on the other side of the seam. The solution possibilities are given in Table 1 below such that the seam will not come apart. If a value G=0.6 is chosen as a compromise between seam integrity and node strength, we find

| | | Node Diameter | D = 0.448 mm | | |
|---|---|---|---|---|---|
| | | Period | w = 0.747 mm | | |
| | | Neck Width | g = 0.299 mm | | |
| | | Node Height | H = 0.69696 | | |
| | | N, lb/in | = 2.0 | | |
| | | E, psi | = 500000 | | |
| | | t, in | = .004 | | |
| G | 1/M | D | w | g | H |
| .5000 | 2.000 | 1.0160 | 2.0320 | 1.0160 | 1.0160 |
| .5100 | 5.5296 | .7239 | 1.4194 | .6955 | .8665 |
| .5200 | 7.7482 | .6469 | 1.2440 | .5971 | .8246 |
| .5300 | 9.7913 | .5984 | 1.1290 | .5306 | .7968 |
| .5400 | 11.7592 | .5629 | 1.0424 | .4795 | .7755 |
| .5500 | 13.6903 | .5351 | .9729 | .4378 | .7580 |
| .5600 | 15.6054 | .5122 | .9147 | .4025 | .7429 |
| .5700 | 17.5179 | .4929 | .8647 | .3718 | .7295 |
| .5800 | 19.4383 | .4761 | .8208 | .3448 | .7174 |
| .5900 | 21.3751 | .4612 | .7818 | .3205 | .7061 |
| .6000 | 23.3363 | .4479 | .7466 | .2986 | .6956 |
| .6100 | 25.3292 | .4359 | .7146 | .2787 | .6856 |
| .6200 | 27.3614 | .4248 | .6852 | .2604 | .6760 |
| .6300 | 29.4406 | .4146 | .6580 | .2435 | .6668 |
| .6400 | 31.5747 | .4050 | .6328 | .2278 | .6578 |
| .6500 | 33.7722 | .3960 | .6093 | .2132 | .6491 |
| .6600 | 36.0424 | .3875 | .5872 | .1996 | .6405 |
| .6700 | 38.3950 | .3794 | .5663 | .1869 | .6320 |
| .6800 | 40.8411 | .3717 | .5466 | .1749 | .6236 |
| .6900 | 43.3927 | .3643 | .5279 | .1637 | .6153 |
| .7000 | 46.0632 | .3571 | .5101 | .1530 | .6070 |
| .7100 | 48.8678 | .3501 | .4931 | .1430 | .5987 |
| .7200 | 51.8235 | .3433 | .4769 | .1335 | .5904 |
| .7300 | 54.9497 | .3367 | .4612 | .1245 | .5820 |
| .7400 | 58.2687 | .3302 | .4462 | .1160 | .5736 |
| .7500 | 61.8060 | .3238 | .4317 | .1079 | .5651 |
| .7600 | 65.5913 | .3174 | .4176 | .1002 | .5565 |
| .7700 | 69.6594 | .3111 | .4040 | .0929 | .5477 |
| .7800 | 74.0510 | .3048 | .3908 | .0860 | .5388 |
| .7900 | 78.8149 | .2986 | .3779 | .0794 | .5297 |
| .8000 | 84.0090 | .2923 | .3653 | .0731 | .5204 |
| .8100 | 89.7035 | .2860 | .3530 | .0671 | .5109 |
| .8200 | 95.9840 | .2796 | .3410 | .0614 | .5012 |
| .8300 | 102.9563 | .2731 | .3291 | .0559 | .4911 |
| .8400 | 110.7522 | .2666 | .3173 | .0508 | .4807 |
| .8500 | 119.5388 | .2599 | .3057 | .0459 | .4700 |
| .8600 | 129.5306 | .2530 | .2942 | .0412 | .4588 |
| .8700 | 141.0081 | .2459 | .2827 | .0367 | .4472 |
| .8800 | 154.3451 | .2386 | .2712 | .0325 | .4350 |
| .8900 | 170.0512 | .2311 | .2596 | .0286 | .4222 |
| .9000 | 188.8397 | .2231 | .2479 | .0248 | .4086 |
| .9100 | 211.7410 | .2148 | .2360 | .0212 | .3942 |
| .9200 | 240.2999 | .2059 | .2238 | .0179 | .3787 |
| .9300 | 276.9445 | .1964 | .2112 | .0148 | .3620 |
| .9400 | 325.7211 | .1860 | .1979 | .0119 | .3436 |
| .9500 | 393.9129 | .1746 | .1838 | .0092 | .3231 |
| .9600 | 496.0860 | .1617 | .1684 | .0067 | .2997 |
| .9700 | 666.2290 | .1466 | .1511 | .0045 | .2722 |
| .9800 | 1006.3020 | .1277 | .1303 | .0026 | .2376 |
| .9900 | 2026.1140 | .1012 | .1022 | .0010 | .1885 |

To minimize any time out or nonfunctional area of the belt it is desirable to have the seam width be as narrow as possible. Further, this enables the seam to be indexed so that it does not participate in belt functionality such as the formation and transfer of a toner or developer image. Typically, the seam is from about 1 mm to about 3 mm wide.

With reference to the embodiment illustrated in FIG. 2, the seam may be typically of the order of one inch wide on a belt which is 16 to 18 inches long depending on roll diameter, material modulus or other parameters and the post and head pattern may be formed from a male/female punch cut with each end being cut separately and subsequently being joined to form the seam with a roller similar to that used as a wall paper seamer rolled over the seam by hand to complete the interlocking nature of the puzzle cut pattern.

The two ends of the belt material are joined by physically placing them together in interlocking relationship. This may require the application or pressure to properly seat or mate the interlocking elements.

As previously discussed, in addition, the endless flexible seamed belt being joined by a plurality of mutually mating elements in a puzzle cut pattern in interlocking relationship to form a seam, the seam has a kerf or voids between the mutually mating elements which are bonded together or adhesively bonded with material which is chemically and physically compatible with the material from which the belt is fabricated and which is bound to the belt material. This bond is formed by the application of an adhesive material which is cured by exposure to ultraviolet radiation. Typical such adhesive include: modified acrylics such as, Loctite 370, 375, 376 and 17177 a urethane methacrylic; Dymax 484, 20143 which are polyurethane aligomer mixtures; Norland 61, 68, 72, 81, 91 which are mercapto ester/acrylates; and Beacon 2510 which is a plasticized epoxy. Other generic materials which may be useful as a UV curable adhesive include silicones, acrylics, alkylene methacrylite and epoxy resins. Such a UV curable adhesive has the advantage of not raising the temperature of the belt material to such a degree that the belt nodes are distorted and thermal and mechanical stresses in the belt material create little ripples in the belt material, which causes a copy quality defect, particularly through a deletion of toner material during transfer. The ultraviolet curable adhesive is crosslinked within itself on curing and also to the belt material. While the ultraviolet curable adhesive should-be cured by exposure to ultraviolet radiation, it should not otherwise affect the belt material by distorting the belt material but rather should be chemically and physically bound to the belt material. Applying an adhesive which is cured by exposure to ultraviolet radiation has the additional advantage of providing a fast curing process, a rugged cured material, low heat generation, an oxygen free cure capable of versatile application in hard to reach places, and provides a complete cure. It may be cured with a pulsed curing procedure, or a continuous UV curing procedure. Preferably, the UV curable material is transparent to enable the radiation to penetrate through the material to provide a complete cure.

Following fabrication, the belt may be finished by way of buffing or sanding and further, may have an overcoating applied, typically, of a thickness of 0.001 to 0.003 inch in thickness which can be initially applied to the unseamed belt, the belt seamed and the seamed area filled from the back of the belt to maintain the uniformity of the functional surface. Preferably, and by far the most economical matter is to form the belt seam initially and then apply the desired overcoating.

EXAMPLE

Figure 9:
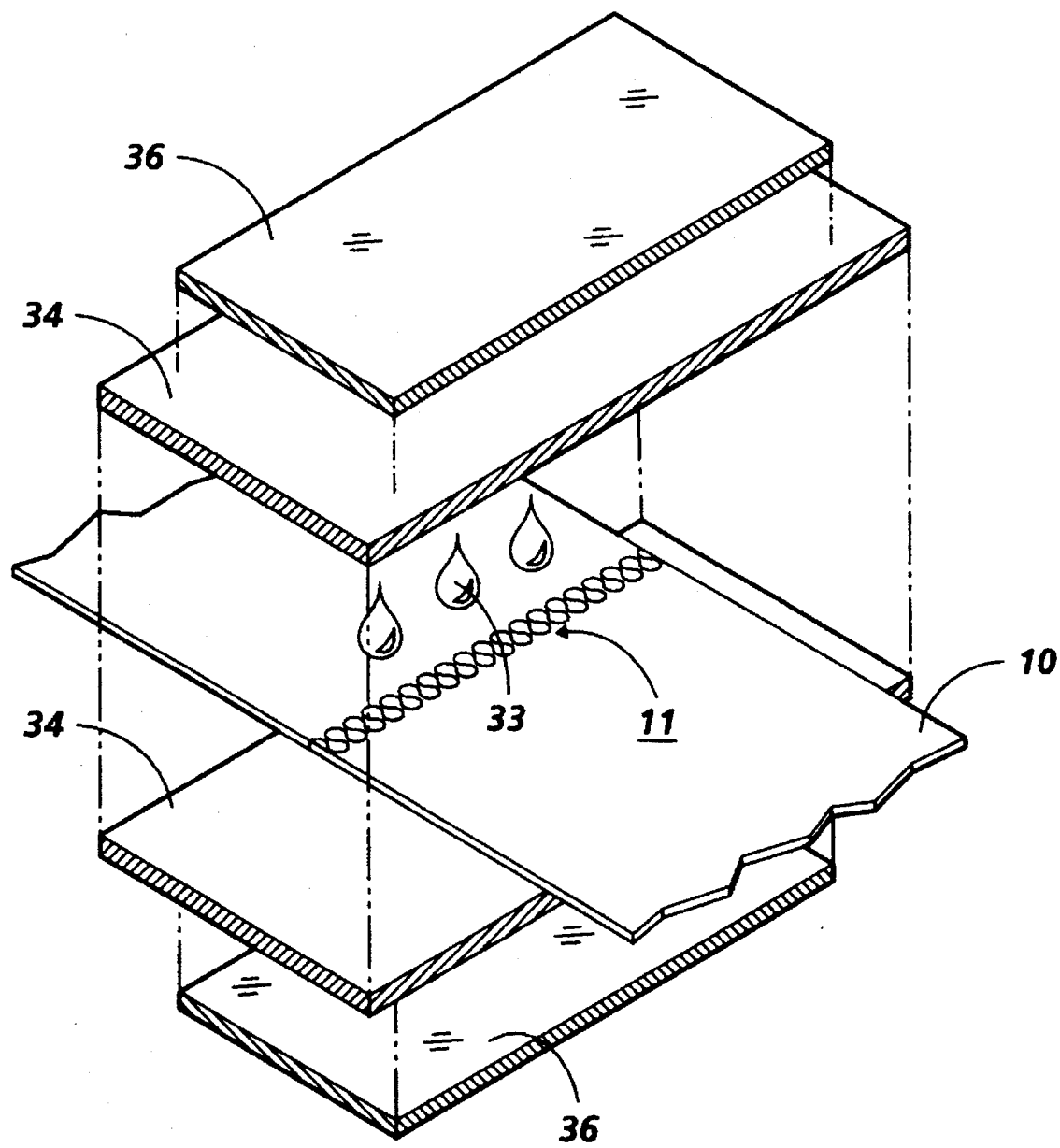
FIG. 9 is an exploded isometric view of an arrangement, typically a manual arrangement, wherein the seam and the puzzle cut pattern of the belt is bound or joined together by an adhesive applied to the seam and pressure applied to the seam belt with the adhesive therein to both sides of the belt.
Figure 10:
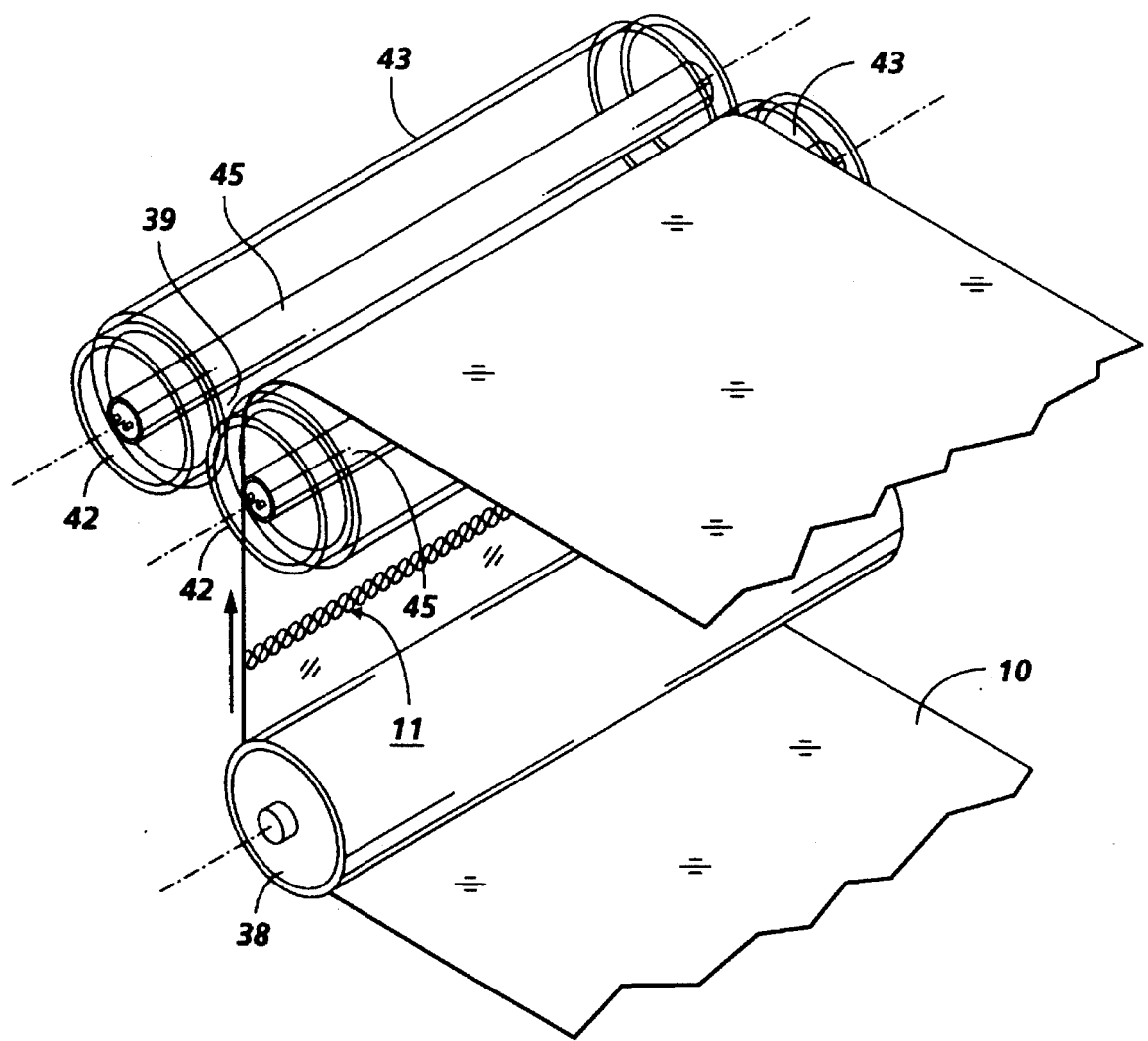
FIG. 10 is an isometric illustration of an automated process which may be used to manufacture the puzzle cut seamed belts with an adhesive which is cured by exposure to ultraviolet radiation.

Turning now to FIGS. 9 and 10. FIG. 9 shows a typical manual arrangement for forming the UV adhesive cured puzzle cut seam by cutting, for example, a one inch wide strip of the belt material which was a polycarbonate/Tedlar laminate to provide a belt about twelve inches long. Both ends of the belt have a puzzle cut pattern such as that illustrated in FIG. 2 having 0.5 mm radius cut using a one inch die cut fixture. The seam was assembled and a one to two mm bead of adhesive 33, Norland 61, was applied over the seam which was then assembled as illustrated between two pieces of transparent Teflon™ cured adhesive and two glass microscope slides 36 to provide a rigid flat surface making a small curing fixture, which was then clamped together. The sample seam was exposed to UV radiation using a Xenon RC-500B pulsed curing system for 10 seconds/side after which the clamps were removed, the fixture dissassembled and the belt recovered.

FIG. 10 is an isometric representative of an alternative manufacturing process when the belt with seam assembled is transported by drive roller 38 into a nip 39 formed by two rotatable transparent glass drums 42 having a transparent surface coating 43 a silicone with each drum having a lamp 45 at its axis emitting UV radiation to cure the adhesive. The adhesive is applied to the seam just before it enters the nip. The dwell time in the nip is sufficient to cure the adhesive.

Thus, according to the present invention an endless flexible seamed belt is formed which is mechanically invisible and substantially equivalent in performance to a seamless belt. Furthermore, a seamed belt is provided by joining two ends wherein each end is fabricated having a plurality of mutually mating elements in a puzzle cut pattern which are in interlocking relationship. The assembly process enables accurate placement of the mating elements thereby permitting ease of assembly merely be mating the two pieces together placing the UV curable adhesive in the seam so that upon exposure to ultraviolet radiation it will fill the kerf 20 and bond the mating elements together. Further, a principle advantage is that there is no height differential between adjacent portions of the seam leading to the difficulties discussed above associated with seamed belts made by overlapping seams or a butting seam wherein a differential height is present or inadequate adhesion is present leading to vibrational noise effecting xerographic development and transfer as well as ineffectual cleaning of residual toner from a photoreceptor material from which the toner has been transferred as well as belt tracking and other features. Furthermore, it is believed that the seam so formed provides enhanced strength, flexibility, longer mechanical life.

Furthermore, by using an adhesive curable by exposure to ultraviolet radiation in either a pulsed or continuous curing process, a fast, complete cure is achieved under low heat conditions, and in an oxygen free environment. Furthermore, it provides a rugged bond and the complete cure of the adhesive.

The above cross referenced patent applications together with the patents cited herein are hereby incorporated by reference in their entirety in the instant application.

While the above invention has been described with reference to specific embodiments it is not intended to be limited thereto but rather those skilled in the art will recognize that variations and modifications may have sufficient physical integrity to enable the seamed flexible belt to essentially function as an endless belt and be made therein which are within the spirit of the scope and the appended claims.

It is claimed:

1. An endless, seamed, flexible belt comprising a strip of a flexible material having two ends that are joined to form the endless belt having a substantially uniform thickness and only a single seam, the two ends having a plurality of mutually mating elements in a puzzle cut pattern, the opposite surfaces of the two ends being in an interlocking relationship to prevent separation of the two ends, the surfaces of the mutually mating elements defining voids therebetween to permit the presence of an ultraviolet radiation cured adhesive, the seam including the ultraviolet radiation cured adhesive in the voids between the surfaces of the mutually mating elements, wherein there is absent any substantial thickness differential between the seam and the adjacent interlocking mating elements, wherein the seam extends linearly across the entire width of the belt, and wherein there are absent thermally induced distortions in the belt caused by the curing of the adhesive.

2. The seamed belt of claim 1 wherein the opposite surface of the puzzle cut pattern have been joined by an ultraviolet radiation cured adhesive which is physically and chemically compatible with the belt material.

3. The seamed belt of claim 1 wherein the cured adhesive is crosslinked within itself.

4. The seamed belt of claim 3 wherein the cured adhesive is crosslinked to the belt material.

5. The seamed belt of claim 1 wherein the belt is fabricated from a thermoplastic material.

6. The seamed belt of claim 1 wherein the belt is fabricated from a thermoset material.

7. The seamed belt of claim 2 wherein the cured adhesive is made from the same type of material from which the belt is fabricated.

8. The seamed belt of claim 2 wherein the cured adhesive and the belt material are thermoplastics.

9. The seamed belt of claim 2 wherein the cured adhesive is a different material from which the belt is fabricated.

10. The seamed belt of claim 2 wherein the cured adhesive substantially fills the voids between the opposite surfaces of the mutually mating elements.

11. The seamed belt of claim 1 wherein the seam is mechanically invisible and substantially equivalent in performance to a seamless belt.

12. The seamed belt of claim 1 wherein the cured adhesive is chemically bound to the material from which the belt is fabricated.

13. The seamed belt of claim 1 wherein said cured adhesive is physically bound to the material from which the belt is fabricated.

14. The seamed belt of claim 1 wherein the seam mechanical bonding strength and flexibility provides sufficient physical integrity to enable the seamed flexible belt to essentially function as an endless belt.

15. The seamed belt of claim 1 wherein the interlocking elements all have curved mating surfaces.

16. The seamed belt of claim 1 wherein the mutually mating elements are male and female interlocking portions.

17. The seamed belt of claim 1 wherein all the mutually mating interlocking elements have the same configuration.

18. The seamed belt of claim 1 wherein each interlocking element has a post portion and a larger head portion.

19. The seamed belt of claim 18 wherein each of the post portion and head portion form interlocking nodes.

20. The seamed belt of claim 1 wherein the mutually mating interlocking elements form a dovetail pattern.

21. The seamed belt of claim 1 wherein the height differential between the seamed portion and the adjacent unseamed portion is less than about 0.001 inch.

22. The seamed belt of claim 1 wherein the tensile strength of the seam is at least 80% of the tensile strength of the parent belt material.

23. The seamed belt of claim 1 wherein the seam extends across the belt at an angle with respect to the parallel sides of the belt.

* * * * *